United States Patent [19]

Vonk et al.

[11] Patent Number: 4,738,996
[45] Date of Patent: Apr. 19, 1988

[54] ASPHALTIC COATING COMPOSITIONS

[75] Inventors: Willem C. Vonk; Gerrit van Gooswilligen, both of Amsterdam, Netherlands

[73] Assignee: Shell Oil Company, Houston, Tex.

[21] Appl. No.: 846,648

[22] Filed: Mar. 31, 1986

[30] Foreign Application Priority Data

Oct. 10, 1985 [GB] United Kingdom ............... 8525003

[51] Int. Cl.$^4$ ............................................. C08J 3/20
[52] U.S. Cl. ........................................ 524/59; 106/277; 524/68; 427/409
[58] Field of Search .................... 524/68, 59; 106/277

[56] References Cited

U.S. PATENT DOCUMENTS

| | | | |
|---|---|---|---|
| 3,978,014 | 8/1976 | van Beem et al. | 524/68 |
| 4,288,497 | 9/1981 | Tanaka et al. | 428/477 |
| 4,330,449 | 5/1982 | Maldonado et al. | 524/68 |
| 4,409,345 | 10/1983 | Moteki et al. | 524/68 X |
| 4,412,864 | 12/1983 | Kurashige et al. | 106/235 |
| 4,490,493 | 12/1984 | Mikols | 524/68 |

FOREIGN PATENT DOCUMENTS 1431530 of 1974 United Kingdom .
2037780 of 1978 United Kingdom .

[56] References Cited

OTHER PUBLICATIONS

Abstract of Japan, 58/040,349. Published March 1983, Asahi Chemical Ind.
Abstract of Germany, 3,306,439. Published August 1984, Phoenix AG

*Primary Examiner*—Thurman K. Page

[57] ABSTRACT

A composition which contains (a) 80 to 99% w of a bitumen component; (b) 1 to 20% w of an elastomer; (c) 1 to 60% w of a hydrocarbon resin which has been modified to contain carboxyl, carboxylic anhydride, hydroxyl and/or amino groups; and (d) 1 to 100% w of an inorganic filler, the weight percentages being based on the total weight of the bitumen component and elastomer, is suitable for coating structures and a process for applying the composition at elevated temperature onto a suitbale structure.

12 Claims, No Drawings

ASPHALTIC COATING COMPOSITIONS

The invention relates to an asphaltic composition which is suitable for coating structures such as pipes. The composition is in particular suitable for use as a coating on pipes, tubes, conduits and the like. The asphaltic composition contains a bitumen component, an elastomer and an inorganic filler.

Similar asphaltic compositions are taught in British patent specification No. 1,538,267. The known compositions may contain a bitumen component, a elastomer, an inorganic filler and a wax. The advantages of the known compositions reside in that the compositions have both satisfactory mechanical properties and good corrosion protection performance. The mechanical properties of the compositions are assessed by means comparing the results of standard tests regarding e.g. the flow of a layer and the bending performance of a layer of the composition. The presence of wax in the known composition tends to improve its flow behavior.

It appears, however, that the adhesion properties of the known compositions, i.e. the adhesion of the composition to a structure, is not optimal. Especially when the coated structure is subjected to varying temperatures, the coating can be peeled off relatively easily. The present invention provides an asphaltic composition which combines the favorable mechanical properties of the known compositions with good adhesion properties.

Accordingly, the present invention relates to an asphaltic composition, which comprises (a) 80 to 99%w of a bitumen component; (b) 1 to 20%w of an elastomer; (c) 1 to 60%w of a hydrocarbon resin, which has been modified to contain carboxyl, carboxylic anhydride, hydroxyl and/or amino groups; and (d) 1 to 100%w of an inorganic filler, with the weight percentages based on the total weight of the bitumen component and elastomer. The addition of modified hydrocarbon resin results in a composition having improved adhesive properties without substantially affecting the mechanical properties of the composition.

Hydrocarbon resins are relatively low molecular weight thermoplastic polymers derived from cracked petroleum distillates, turpentine fractions, coal tar or a variety of pure olefinic monomers. The average molecular weight tends to range from 500 to 5000, and is preferably below 2000. The molecular weight distribution may be analyzed by gel permeation chromatography. Suitable resins derived from pure olefinic monomers include the products obtained by polymerization of vinylaromatic compounds, such as styrene, $\alpha$-methylstyrene, vinyltoluene, $C_{1-3}$ alkylstyrene, etc., or aliphatic mono-olefins such as isobutylene. The polymerization is suitably carried out in the presence of $BF_3$. Preferably hydrocarbon resins are employed in the composition of the invention which are derived from cracked petroleum distillates, turpentine fractions or coal tar. Even more preferred are petroleum resins or coumarone-indene resins which are modified and then used in the inventive composition. Petroleum resins are low molecular weight thermoplastic hydrocarbon resins derived from cracked petroleum fractions, such as thermally cracked fractions or fractions obtained after pyrolysis of hydrocarbon feedstock. Coumarone-indene resins are derived from coal tar. Although these resins contain coumarone and indene, the name is not very accurate since the resins also contain a fair number of other monomers, as will be appreciated by a person skilled in the art. The hydrocarbon resins may influence the consistency of the asphaltic composition. Use of a hydrocarbon resin of a less aromatic type might result in a tougher composition, as can be determined by indentation tests.

The modified hydrocarbon resins are suitably prepared by treating a hydrocarbon resin with a carboxylic acid or anhydride, or an unsaturated hydroxyl- or amino-group-containing compound, or by polymerizing the unsaturated hydrocarbons which are to yield the hydrocarbon resin in the presence of an unsaturated carboxylic acid, anhydride or an unsaturated hydroxyl- or amino-group-containing compound, or by mildly oxidizing the untreated hydrocarbon resin to yield hydroxyl and/or carboxyl-groups containing resins. The above-mentioned treatment may be carried out by various methods known in the art. So, it is possible to graft the resins with unsaturated compounds having the desired functional group using an initiator such as a peroxide or an organic lithium compound. The copolymerization of unsaturated compound having the desired functional group with the unsaturated hydrocarbons which are to yield the hydrocarbon resin, may be carried out using maleic anhydride, maleic acid, vinylalcohol, acrylic or methacrylic acid or unsaturated acid derivatives having a hydroxyl- and/or amino group (esters, amides, halides). Preferably, the modified resins are prepared by using maleic anhydride or maleic acid, either in a treatment of the hydrocarbon resin or in the polymerization to yield the modified hydrocarbon resin. The modified resins suitably have acid values of 1-100, preferably 5-50 mgeq KOH/g.

The bitumen component of the asphaltic coating composition according to the invention may be any bitumen from natural or pyrogenous origin. Preferably, the bitumen is derived from a mineral oil. Suitable bitumen components derived from a mineral oil include a long residue, a short residue, a thermally cracked residue, precipitation bitumen or the blown product of each of the mentioned components. Propane bitumen or blown propane bitumen is also suitable within the scope of the invention. Of course, mixtures of bitumen components can be used as well. Mixtures of bitumens and extender oils can be employed as the bitumen component.

The bitumen component employed in the composition according to the invention suitably has a penetration of 2-50 dmm at 25° C. and a softening point from 50°-150° C. These properties are determined according to well-known ASTM methods. These properties render the bitumen component suitable for use in coatings on pipelines or similar conduits when these are used in under-water or under-ground environments.

The asphaltic composition according to the invention contains an elastomer. Elastomers are generally associated with polymers of dienes, such as butadiene or isoprene, or with copolymers of such dienes with a vinylaromatic compound, such as styrene. It is emphasized that the elastomer used in the composition of the invention is not restricted to these particular polymers or copolymers. Suitable elastomers include polyesters, polyacrylates, polysulphides, polysilicones and polyesteramides, provided they show an elastomer behavior. Preferably, the elastomer used is a block copolymer or hydrogenated block copolymer of a monovinyl aromatic hydrocarbon or a 1-alkene and a conjugated diene. Suitable dienes are dienes with from 4 to 8 carbon atoms per monomer, in particular butadiene and isoprene. Suitable monovinyl aromatic hydrocarbons are α-methyl styrene, vinyl toluene, vinyl xylene, and in particular styrene. The 1-alkenes used are preferably 1-alkenes having from 2 to 12 carbon atoms per monomer, such as ethylene, propene, 1-butene, 1-hexene, 1-octene. The block copolymer may be linear having the configuration

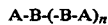

in which A represents a polyvinyl aromatic or poly-1-alkene block, B represents a polydiene block and n represents an integer ranging from 1 to 5. Suitably n is 1, yielding a three-block copolymer of the configuration A-B-A. The block-copolymer may also be branched or star-shaped having the configuration A-B-(B-A)$_m$ in which m represents an integer from 2 to 8, A represents a polyvinyl aromatic or poly-1-alkene block, and B represents a polydiene block. The amount of polymer blocks A in the block copolymer suitably ranges from 10 to 70%w, more preferably from 20 to 50%w.

The polymer blocks A advantageously have a number average molecular weight in the range from 2,000 to 100,000, in particular from 5,000 to 50,000. The polymer blocks B preferably have a number average molecular weight in the range of from 25,000 to 1,000,000, particularly from 30,000 to 150,000.

The preparation of the block copolymer is known in the art. In British patent specification No. 1,538,266 a number of methods for preparing suitable block copolymers are described. For the preparation of star-shaped copolymers, suitable coupling agents such as adipates or silicon-compounds or a nucleus prepared by obligomerization of di- or tri-vinyl benzene can be used. Other coupling agents which can be used within the scope of the invention can be selected from polyepoxides, such as epoxidized linseed oil, polyisocyanates, e.g. benzo-1,2,4-triisocyanate, polyketones e.g. hexane-1,3,6-trione, polyanhydrides or polyhalides. The hydrogenation of the block copolymer, if desired, may be carried out as described in British patent specification No. 1,538,266.

A wide variety of inorganic compounds may be used as filler. Those having such a particle size wherein at least 5%w is retained on an ASTM 200 sieve are preferred. The fillers which give the best results are talc and slate dust. Other suitable fillers include asbestos, siliceous fillers such as silicates, and calcareous fillers. Mixtures of different fillers may also be used. Suitable amounts of inorganic filler are from 1 to 100%w, preferably from 20 to 80%w, based on the total weight of the bitumen component and the elastomer.

The inventive composition is suitable for use as a coating on a structure, in particular pipes, tubes or conduits. To use the composition as a coating the composition may be applied, generally at elevated temperatures onto the structure. Preferably, a primer is applied to the structure first.

Accordingly, the invention also relates to a process for coating a structure, in particular a pipe, tube or conduit with an asphaltic composition as described hereinbefore. The process can include the steps in which a structure is first coated with a primer which comprises bitumen and at least one resin in a solvent, and then at elevated temperatures the asphaltic composition is applied onto the primer coating. Suitable primers preferably contain a hydrocarbon resin. This hydrocarbon resin may or may not be modified as described hereinabove.

The primer advantageously contains an elastomer, in particular a block copolymer or hydrogenated block copolymer of a monovinyl aromatic hydrocarbon or 1-alkene and a conjugated diene, as described above. However, use of other elastomers, such as those mentioned hereinbefore or polychloroprene, is not excluded. It appears that suitable primers are rather similar to the asphaltic composition with the exception that they do not contain a substantial amount of inorganic filler and that they contain an appreciable amount of a solvent. The solvent may be selected from a wide variety of organic compounds. Suitable solvents include aromatic solvents such as benzene, toluene, xylene; chlorohydrocarbons such as chlorinated methane, ethane, propane, butane; mineral oil fractions such as gasolines, kerosenes; or mixtures of any of these solvents. The primer preferably contains from 40 to 90%w of a solvent of 60 to 70%w of a residue which comprises from 1 to 25%w of a block copolymer, from 10 to 15%w of a resin and from 25 to 89%w of a bitumen.

The process for coating a structure is preferably carried out by applying the primer onto the structure at a temperature ranging from 0° to 100° C., and preferably from 30° to 50° C. After cooling down and after most of the solvent is evaporated, the asphaltic composition, according to the invention, is applied onto the primer coating, preferably at a temperature of from 120° to 210° C., in particular from 150° to 190° C. These temperatures generally ensure that the inventive composition is of sufficiently low viscosity to be applied relatively easily. Preferably, the asphaltic composition has a viscosity between 1500 and 2500 cS when it is applied. In the case of pipe coating, the thickness of the coating comprising the primer and the asphaltic composition is preferably at least 3 mm and in the range between about 3 and about 10 mm.

After a structure has been coated with an asphaltic composition according to the invention, it may be further coated by a layer of concrete, paper, plastic or the like.

The invention will be illustrated with reference to the following example to which the invention by no means is restricted.

EXAMPLE

Two asphaltic compositions I and II were prepared and used to coat objects such as metal plates and pipes. The objects were pretreated with one or two primers A and B consisting of a Middle East propane bitumen (17.5%w), an aromatic-type petroleum resin (7.5%w), xylene (35.0%w) and 1,1,1-trichloroethane (35%w). Primer A further contained 5.0%w of a styrene-butadiene-styrene block copolymer, whereas primer B contained 5%w polychloroprene (Neoprene).

The asphaltic compositions contained a Middle East propane bitumen having a softening point of 53° C. and a penetration of 30 to 35 dmm at 25° C. (48.5%w); a polystyrene-polybutadiene-polystyrene block copolymer having an average number molecular weight of about 16,000-140,000-16,000 (7.5%w); and slate dust with 96%w of the particles having a size of from 20 to 149 μm (30%w). The balance, (14%w), was, for composition I, a paraffin wax and for composition II, a thermoplastic petroleum resin based on cycloaliphatic and alkyl aromatic compounds with a resin which has been modified by treatment with maleic anhydride, to yield a carboxyl-group containing resin having an acid value of 11 mgeq KOH/g.

The coated objects were subjected to a flow test and a bend test according to Dutch standard NEN No. 6910. The flow test results had to be 6 mm or less. The bend test was a fail/pass test.

The objects were also tested regarding the adhesion of the asphaltic composition to the objects. This was done by attempting to peel the coating off after a temperature cycle of, storage at 70° C., and subsequent storage at −15° C. The coating was then subjected to a the peel test according to BS 4147 at ambient temperature. If the coating could not be peeled off, the composition passed the test; otherwise, it failed.

Results of the test and some properties of the compositions are indicated in the Table.

TABLE

| Asphaltic composition | II | II | II |
| --- | --- | --- | --- |
| Primer | A | A | B |
| Softening point, °C. | 110 | 101 | 101 |
| Penetration dmm | 17.5 | 10.5 | 10.5 |
| Flow mm | 1 | 4 | 5 |
| Bend | Pass | Pass | Pass |
| Adhesion | Fail | Pass | Pass |

From the above results the asphalted composition according to the invention showed an improvement in adhesive properties.

What is claimed is:

1. A composition which comprises (a) 80 to 99%w of a bitumen component; (b) 1 to 20%w of an elastomer; (c) 1 to 60%w of a hydrocarbon resin which has been modified to contain carboxyl, carboxylic anhydride, hydroxyl and/or amino groups; and (d) 1 to 100%w of an inorganic filler, the weight percentages being based on the total weight of the bitumen component and the elastomer.

2. The composition according to claim 1, wherein said modified hydrocarbon resin is derived from cracked petroleum distillates, turpentine fractions or coal tar.

3. The composition according to claim 2, wherein said modified hydrocarbon resin is derived from a petroleum resin or a coumarone-indene resin.

4. The composition according to claim 1, wherein the modified hydrocarbon resin has been prepared by a method comprising at least one of the following steps:

(i) treating a hydrocarbon resin with an unsaturated carboxylic acid or anhydride or an unsaturated hydroxyl- or amino-group-containing compound;
(ii) polymerizing the unsaturated hydrocarbons which are to yield the hydrocarbon resin in the presence of an unsaturated carboxylic acid, anhydride or an unsaturated hydroxyl- or amino-group-containing compound; and
(iii) mildly oxidizing the hydrocarbon resin.

5. The composition according to claim 4, wherein the modified hydrocarbon resins have been prepared by using maleic acid or maleic anhydride.

6. The composition according to claim 1, wherein said bitumen component is a member of the group consisting of a long residue, a short residue, a thermally cracked residue, precipitation bitumen, and a blown product of each of the mentioned components.

7. The composition according to claim 1, wherein said bitumen component has a softening point of 50°–150° C. and a penetration of 2–50 dmm at 25° C.

8. The composition according to claim 1, wherein said elastomer is a member of the group consisting of a block copolymer, a hydrogenated block copolymer of a monovinylaromatic hydrocarbon and a 1-alkene and a conjugated diene.

9. The composition according to claim 8, wherein the monovinyl-aromatic hydrocarbon is styrene and the conjugated diene is a member of the group consisting of butadiene and isoprene.

10. The composition according to claim 8, wherein the block copolymer is a member of the group consisting of a linear polymer having the configuration A-B-(-B-A)$_n$, in which A represents a polyvinylaromatic hydrocarbon or poly-1-alkene block, and B represents a polydiene block and m represents an integer ranging from 1 to 5; and a non-linear block copolymer having the configuration A-B-(-B-A)$_m$, in which m represents an integer from 2 to 8 and A represents a polyvinylaromatic hydrocarbon or poly-1-alkene block, and B represents a polydiene block.

11. The composition according to claim 10, wherein at least one polymer block A has a number average molecular weight of 2,000 to 100,000 and at least one polymer block B has a number average molecular weight of 25,000 to 1,000,000.

12. The composition according to claim 1, in which the inorganic filler is a member of the group comprising talc or slate dust.

* * * * *